US012152498B2

(12) United States Patent
Devi et al.

(10) Patent No.: US 12,152,498 B2
(45) Date of Patent: Nov. 26, 2024

(54) STATOR AERODYNAMIC COMPONENTS WITH NOZZLES AND METHODS FOR CLEANING A TURBOMACHINE

(71) Applicant: NUOVO PIGNONE TECNOLOGIE—S.R.L., Florence (IT)

(72) Inventors: Ravindra Devi, Bengaluru (IN); Vittorio Michelassi, Florence (IT); Roberto Merlo, Florence (IT); Devender Parik, Bengaluru (IN)

(73) Assignee: Nuovo Pignone Tecnologie—S.r.l., Florence (IT)

( * ) Notice: Subject to any disclaimer, the term of this patent is extended or adjusted under 35 U.S.C. 154(b) by 433 days.

(21) Appl. No.: 17/309,881

(22) PCT Filed: Dec. 26, 2019

(86) PCT No.: PCT/EP2019/025489
§ 371 (c)(1),
(2) Date: Jun. 25, 2021

(87) PCT Pub. No.: WO2020/135931
PCT Pub. Date: Jul. 2, 2020

(65) Prior Publication Data

US 2022/0065128 A1 Mar. 3, 2022

(30) Foreign Application Priority Data

Dec. 27, 2018 (IT) ........................ 102018000021067

(51) Int. Cl.
*F01D 25/00* (2006.01)

(52) U.S. Cl.
CPC ........ *F01D 25/002* (2013.01); *F05D 2220/30* (2013.01); *F05D 2230/72* (2013.01); *F05D 2240/128* (2013.01)

(58) Field of Classification Search
None
See application file for complete search history.

(56) References Cited

U.S. PATENT DOCUMENTS

| | | | |
|---|---|---|---|
| 2007/0028947 A1 | 2/2007 | Erickson et al. | |
| 2014/0144151 A1 | 5/2014 | Bifulco | |
| 2015/0233263 A1 | 8/2015 | Battaglioli et al. | |
| 2016/0031261 A1 | 3/2016 | Yamagishi et al. | |
| 2017/0204739 A1 | 7/2017 | Rawson et al. | |
| 2018/0291931 A1* | 10/2018 | Metz | F04D 29/544 |

FOREIGN PATENT DOCUMENTS

| | | | |
|---|---|---|---|
| DE | 102015006080 | A1 | 11/2016 |
| EP | 1388656 | A2 | 2/2004 |
| EP | 2562430 | A1 | 2/2013 |
| JP | 2002130197 | A | 5/2002 |
| JP | 2004068774 | A | 3/2004 |
| JP | 2016196839 | A | 11/2016 |
| WO | 2020135931 | A1 | 7/2020 |

* cited by examiner

*Primary Examiner* — Levon J Shahinian
(74) *Attorney, Agent, or Firm* — Paul Frank + Collins P.C.

(57) ABSTRACT

A stator aerodynamic component is disclosed to be placed inside a flow path of a working fluid of a turbomachine; the component has one or more nozzles for ejecting a liquid into the flow path; the liquid to be ejected comes from a duct internal to the component and in fluid communication with a pipe that is external to the component. Also disclosed is a method for cleaning a turbomachine by ejecting a washing liquid from one or more one stator aerodynamic components.

20 Claims, 8 Drawing Sheets

STATOR AERODYNAMIC COMPONENTS WITH NOZZLES AND METHODS FOR CLEANING A TURBOMACHINE

TECHNICAL FIELD

The subject-matter disclosed herein relates to stator aerodynamic components with nozzles and methods for cleaning a turbomachine, and also turbomachines comprising one or more such components and/or cleaned through such methods.

BACKGROUND ART

Turbomachines, for example rotary compressors and rotary turbines, are machines designed to process a working fluid that flows inside a flow path during operation of the machine. A turbine transfers energy from the working fluid to a rotor of the machine. A compressor transfers energy from a rotor of the machine to the working fluid. The flow path is defined partially by surfaces of a rotor of the machine and partially by surfaces of a stator of the machine.

During operation, a turbomachine, in particular the surfaces delimiting its flow path, gets dirty; this is particularly true for turbomachines used in the "Oil & Gas" industry. Dirt may derive from the composition of the working fluid and/or from substances or droplets or particles carried by the working fluid. Dirt may stick even firmly to the surfaces delimiting the flow path; typical surfaces that get dirty are the airfoil surfaces of (rotary) blades and (stationary) vanes of a turbomachine.

A solution for cleaning a gas turbine compressor is known from US patent application published as "US 2007/0028947 A1". According to this solution, a washing assembly is located at the bellmouth of the compressor upstream of its struts, and includes a number of nozzles ejecting water droplets.

A washing assembly located at the bellmouth of the compressor upstream of its struts is easy to be installed as the bellmouth is quite big and is easily accessible being at the inlet of the machine.

However, a washing assembly located at the bellmouth of the compressor upstream of its struts is fully effective only in cleaning the struts.

Accordingly, it would be desirable to have a cleaning system and method effective in cleaning (stationary) vanes and/or (rotary) blades of a turbomachine, preferably also (stationary) vanes and/or (rotary) blades far from the inlet of the turbomachine.

SUMMARY

According to one aspect, the subject-matter disclosed herein relates to a stator aerodynamic component to be placed inside a flow path of a working fluid of a turbomachine; the component comprises: a duct arranged to receive a liquid from a pipe, and one or more nozzles fluidly connected to said duct and arranged to eject liquid into the flow path; the component further comprises a removable part, and the one or more nozzles are located in the removable part.

According to another aspect, the subject-matter disclosed herein relates to a stator aerodynamic component to be placed inside a flow path of a working fluid of a turbomachine; the component comprises: a duct arranged to receive a liquid from a pipe, and one or more nozzles fluidly connected to said duct and arranged to eject liquid into the flow path; the one or more nozzles are located internally to poles projecting from airfoil surfaces of the stator aerodynamic component.

The stator aerodynamic components as disclosed herein may be used to eject a washing liquid being for example water, in particular demineralized water, and possibly a detergent; however, it may be used to eject other liquids useful for specific applications in a turbomachine.

According to another aspect, the subject-matter disclosed herein relates to a method for cleaning a turbomachine; the method comprises the step of washing blades and/or vanes of the turbomachine by ejecting a washing liquid from at least one stator aerodynamic component placed inside a flow path of a working fluid of the turbomachine.

According to another aspect, the subject-matter disclosed herein relates to a turbomachine comprising at least one stator aerodynamic component; the stator aerodynamic component is placed inside a flow path of a working fluid of the turbomachine; the component comprises: a duct arranged to receive a liquid from a pipe, and one or more nozzles fluidly connected to said duct and arranged to eject liquid into the flow path.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
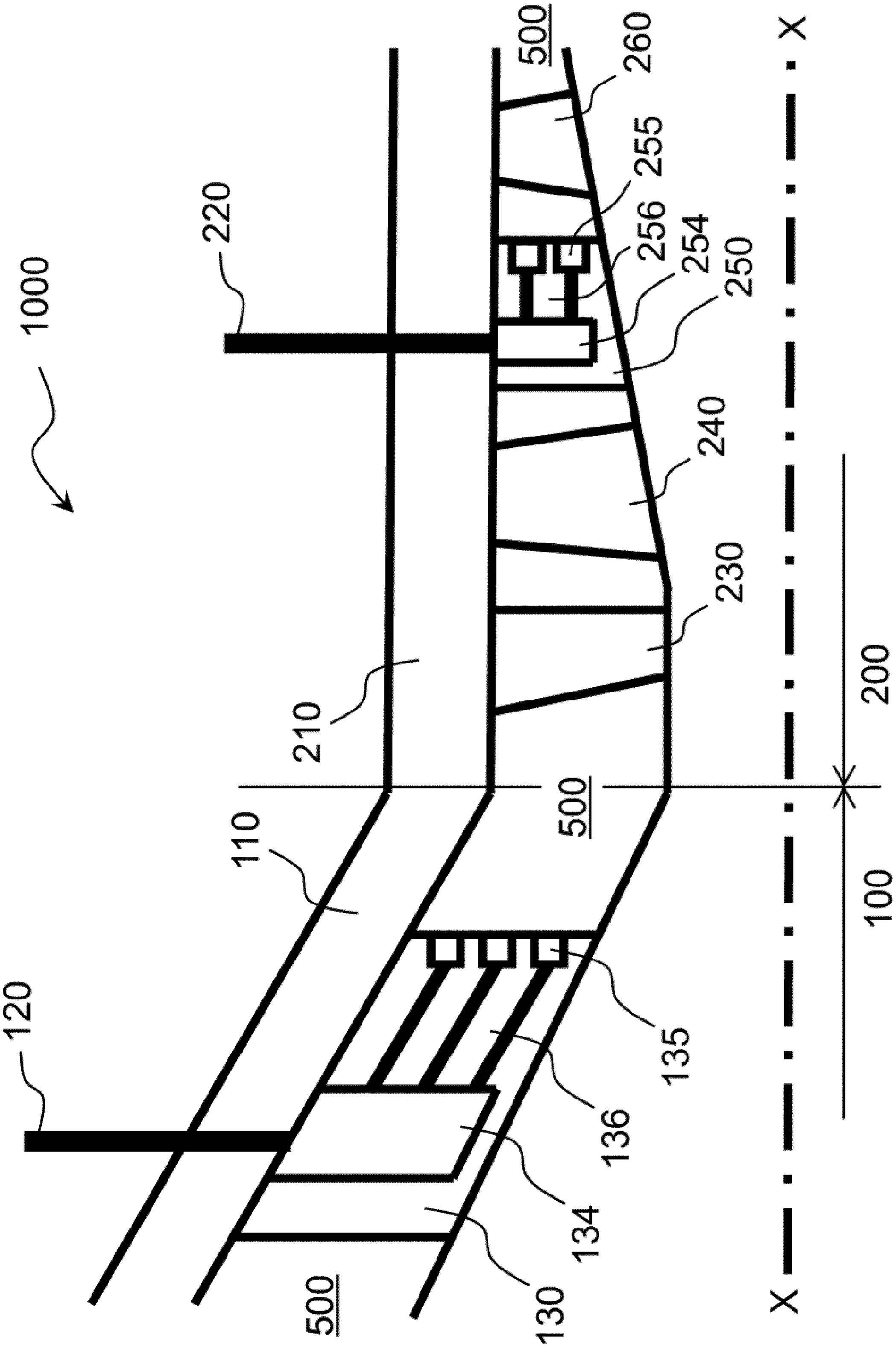
FIG. 1 illustrates a partial schematic longitudinal-section view of an embodiment of a turbomachine, namely a compressor.

In order to clean a dirty surface, a washing liquid, for example water, may be sprayed onto the surface from one or more nozzles. Cleaning is very effective if the nozzle is very close to the surface to be cleaned. Dirt deposits on blades disturb aerodynamic flow around them leading to loss of entire turbine efficiency; furthermore, uneven dirt deposits on blades may cause vibrations; thus effective washing of blades is advantageous.

In a turbomachine, a strut or a (stationary) vane is positioned near an array of (rotary) blades that are immediately downstream of the strut or vane. During rotation of the rotor, the distance between a blade of the array and the strut or vane first decreases, reaches a minimum and then increases. To be more precise, during rotation of the rotor, the distance between a leading edge region of the blade of the array and a trailing edge region of the strut or vane first decreases, reaches a minimum and then increases.

As disclosed herein, it has been discovered that a specially configured stator aerodynamic component, for example a strut or a (stationary) vane, equipped with at least one nozzle, may advantageously be used for ejecting a washing liquid from the at least one nozzle that washes (rotary) blades and/or (stationary) vanes downstream, preferably immediately downstream, of the strut or vane. Nozzles for ejecting the washing liquid may advantageously be located at the trailing edge region of the stator aerodynamic component.

As the strut or vane is stationary, the washing liquid may be easily fed to the strut or vane in a continuous manner through e.g. a pipe from a supply system that may be external to the turbomachine.

Use of embodiments of the new stator aerodynamic component is contrary traditional approaches for washing turbomachines, which wash from the exterior of the turbomachine. Advantageously, embodiments of the new stator aerodynamic component and turbomachine "interior" washing method may be used for any (rotary) blades and/or (stationary) vanes even if they are far from the inlet and outlet of the turbomachine, because the cleaning system (e.g., at least a stator aerodynamic component equipped with at least one wash nozzle) is integrated into what are considered to be normal components of the turbomachine, and/or fits within the interior dimensions/spatial volume of the turbomachine to clean from the inside (or interior) of the turbomachine.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When introducing elements of various embodiments the articles "a", "an", "the", and "said" are intended to mean that there are one or more of the elements. The terms "comprising", "including", and "having" are intended to be inclusive and mean that there may be additional elements other than the listed elements.

Referring now to the drawings, FIG. 1 shows a partial schematic longitudinal-section view of an embodiment of a turbomachine, namely a compressor 1000.

Compressor 1000 is divided into a bellmouth section 100 and a compression section 200. Section 100 is enclosed in a bellmouth section casing 110 that is part of the stator of the compressor. Section 200 is enclosed in a compression section casing 210 that is part of the stator of the compressor. Casings 110 and 210 are joined together and may be in a single piece or in multiple pieces fixed between each other. A flow path 500 stretches inside compressor 1000. A rotation axis of the compressor 1000 is indicated as XX.

Bellmouth section 100 includes an array of struts 130 that are parts of the stator of the compressor.

Compression section 200 includes stator vanes and rotor blades. In particular, moving from the inlet to the outlet, i.e. from a low-pressure side of the compressor (on the left of FIG. 1) to a high-pressure side of the compressor (on the right of FIG. 1), there is a first array of vanes 230, a first array of blades 240 (belonging to a first compression stage of the compressor), a second array of vanes 250, a second array of blades 260 (belonging to a second compression stage of the compressor). The vanes 230 and 250 are parts of the stator, and the blades 240 and 260 are parts of the rotor.

Flow path 500 is partially defined by the airfoil surfaces of struts 130, vanes 230 and 250, blades 240 and 260; in other words, these aerodynamic components are placed inside flow path 500 of a working fluid of turbomachine 1000.

According to the embodiment of FIG. 1, compressor 1000 includes two cleaning assemblies, one in the bellmouth section 100 and one in the compression section 200. It is to be noted that according to variants of this embodiment, there may be only one cleaning assembly (for example only the one assembly in the bellmouth section 100 or only the one assembly in the compression section 200), or three cleaning assemblies (i.e. an assembly in the bellmouth section 100 and two assemblies in the compression section 200, one for each compression stage of the compressor), or even more cleaning assemblies.

The first cleaning assembly in FIG. 1 includes a duct 134 and e.g. three nozzles 135 fluidly connected to duct 134 through e.g. three channels 136. Duct 134 receives a washing liquid from a pipe 120; in particular, duct 134 is completely internal to strut 130 and pipe 120 comes from outside of compressor 1000, goes through casing 110 and reaches duct 134. The nozzles eject the washing liquid into flow path 500. It is to be noted that according to variants of this embodiment, the number of nozzles may vary but being greater than one.

Figure 5:
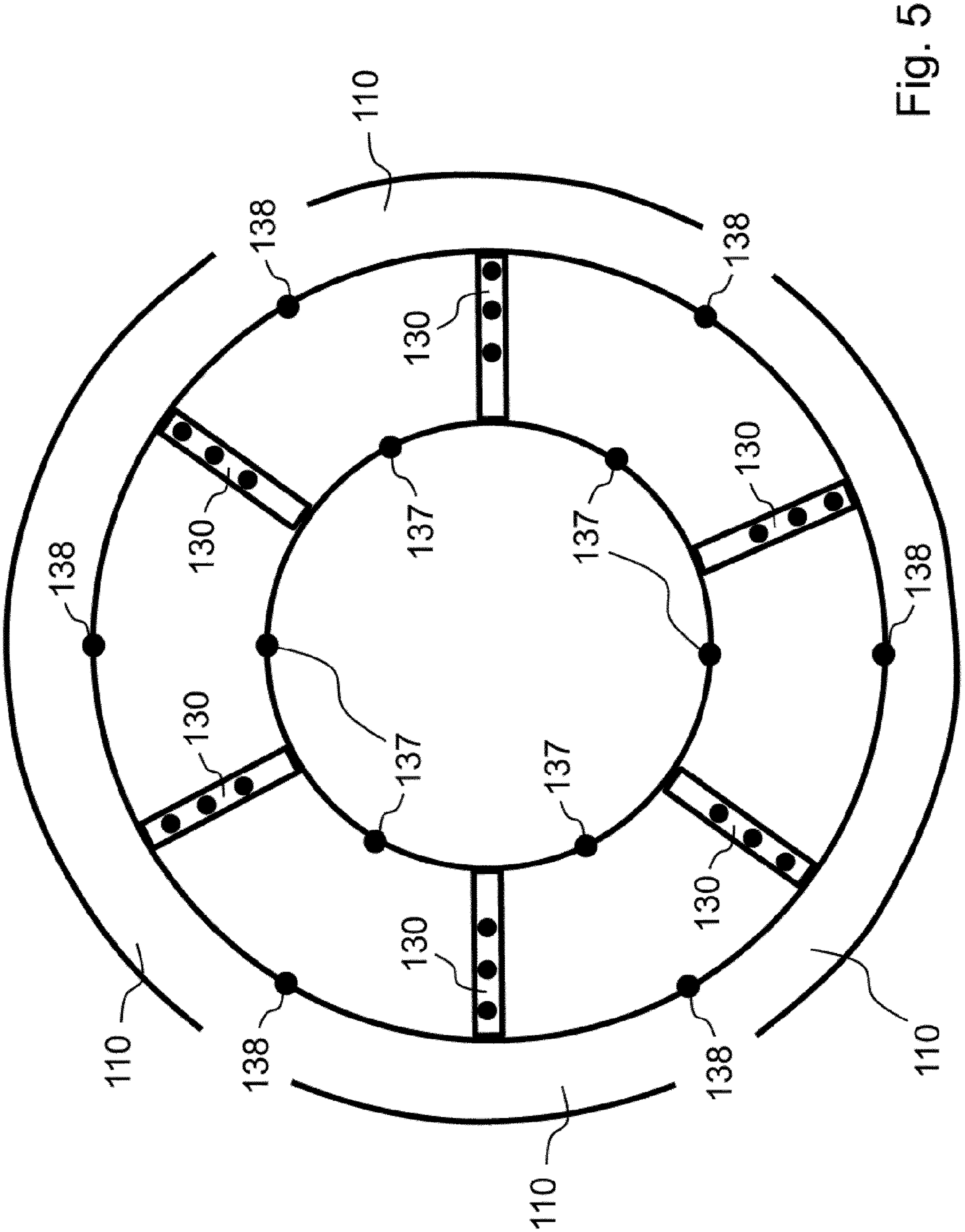
FIG. 5 illustrates a schematic front section view of an embodiment of the struts of the turbomachine of FIG. 1.

As can be appreciated from e.g. FIG. 5, compressor 1000 has a number of struts 130, in particular six struts. In the embodiment of FIG. 1, at least one of the struts has a duct and one or more nozzles; however, preferably, this is replicated in one or two or three or more or all the struts (as shown in FIG. 5).

Washing liquid ejected from nozzles 135 is very effective in cleaning vanes 230 of turbomachine 1000 being immediately downstream of struts 130 of turbomachine 1000. Washing liquid ejected from nozzles 135 is still effective in cleaning blades 240 of turbomachine 1000 being in turn immediately downstream of vanes 230 of turbomachine 1000.

The second cleaning assembly in FIG. 1 includes a duct 254 and e.g. two nozzles 255 fluidly connected to duct 254 through e.g. two channels 256. Duct 254 receives a washing liquid from a pipe 220; in particular, duct 254 is completely internal to vane 250 and pipe 220 comes from outside of compressor 1000, goes through casing 210 and reaches duct 254. The nozzles eject the washing liquid into flow path 500. It is to be noted that according to variants of this embodiment, the number of nozzles may vary but being greater than one.

As can be appreciated, compressor 1000 has a number of vanes 250. In the embodiment of FIG. 1, at least one of the vanes 250 has a duct and one or more nozzles; however, preferably, this is replicated in one or more or all the vanes.

Washing liquid ejected from nozzles 255 is very effective in cleaning blades 260 of turbomachine 1000 being immediately downstream of vanes 250 of turbomachine 1000.

From the above, it is apparent that the stator aerodynamic component comprising a cleaning assembly may be a bellmouth strut (for example strut 130) or an inlet guide vane (for example vane 230) or intermediate guide vane (for example vane 250).

Figure 3:
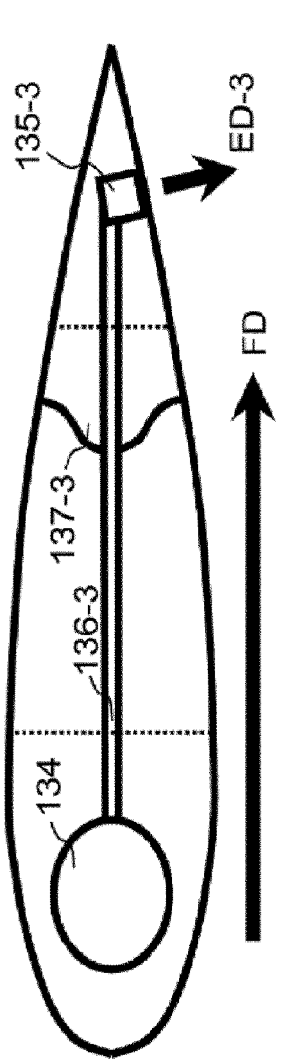
FIG. 3 illustrates a schematic cross-section view of a second embodiment of a strut of the turbomachine of FIG. 1.
Figure 2:
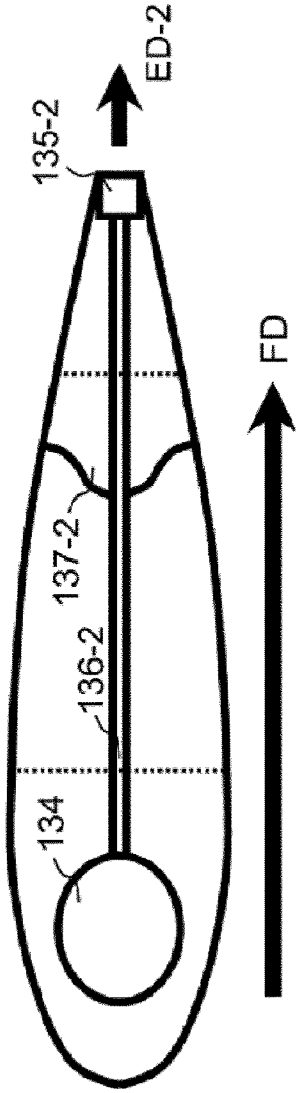
FIG. 2 illustrates a schematic cross-section view of a first embodiment of a strut of the turbomachine of FIG. 1.
Figure 4:
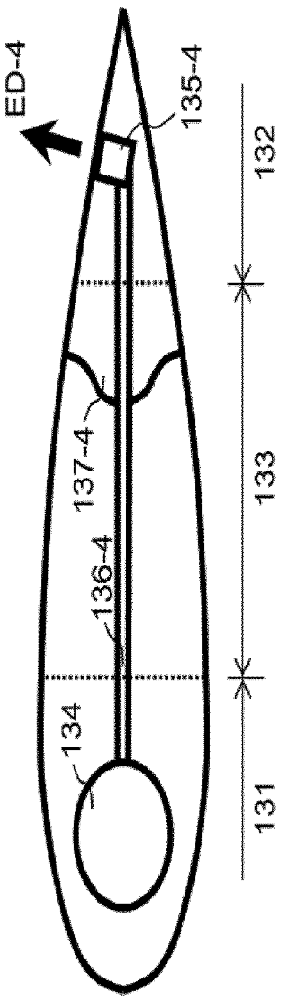
FIG. 4 illustrates a schematic cross-section view of a third embodiment of a strut of the turbomachine of FIG. 1.

Referring to FIG. 2 and FIG. 3 and FIG. 4, a stator aerodynamic component, for example strut 130, may be divided into a leading edge region 131, a trailing edge region 132 and an intermediate region 133. According to these embodiments, nozzles 135-2, 135-3, 135-4 of the component are located in trailing edge region 132 so to be in a favorable position for effective ejecting washing liquid; however, nozzles 135-2, 135-3, 135-4 are arranged differently as explained later. According to these embodiments, the duct 134 of the component is located in leading edge region 131 where there is big space for housing even a big strut; it is to be noted that the position of duct 134 in these three figures is the same but it may be different according to other embodiments.

Referring to FIG. 2, there is at least one nozzle 135-2 (receiving washing fluid from a channel 136-2) arranged to eject washing liquid in an ejection direction ED-2 corresponding to a flow direction FD of flow path 500; regarding the angle, you may consider a tolerance of +/−5°. In this case, the nozzle is on the tip of trailing edge region 132.

Referring to FIG. 3, there is at least one nozzle 135-3 (receiving washing fluid from a channel 136-3) arranged to eject washing liquid in an ejection direction ED-3 inclined with respect to a flow direction FD of flow path 500, the inclination being between −5° and −90°; regarding the angle, you may consider a tolerance of +/−5°. In this case, the nozzle is on a first lateral surface of trailing edge region 132.

Referring to FIG. 4, there is at least one nozzle 135-4 (receiving washing fluid from a channel 136-4) arranged to eject washing liquid in an ejection direction ED-4 inclined with respect to a flow direction FD of flow path 500, the inclination being between +5° and +90°; regarding the angle, you may consider a tolerance of +/−5°. In this case, the nozzle is on a second lateral surface of trailing edge region 132.

It is to be noted that a nozzle may be designed to eject liquid in different directions, i.e. its ejection looks like a wide cone; alternatively, a cone-shaped ejection from a component may derive from the combination of the ejections from a set of nozzles mounted to the component.

It is further to be noted that nozzles of the same component may be arranged to eject liquid in different directions. For example, with reference to FIG. 1, the upper (first radial position) nozzle of strut 130 may eject in a first direction, the middle nozzle (second radial position) of strut 130 may eject in a second direction, the lower nozzle (third radial position) of strut 130 may eject in a third direction.

Referring to FIG. 2 and FIG. 3 and FIG. 4, the component has a removable part 137-2, 137-3, 137-4, and the nozzles 135-2, 135-3, 135-4 are located in the removable part 137-2, 137-3, 137-4. In general, in embodiments different from these figures, the nozzles of the cleaning assembly and/or the duct of the cleaning assembly may be located in the removable part. The removal part may be useful in order to facilitate repairing compressor 1000. The removal part may be useful in order to facilitate customizing compressor 1000 to the requirement of e.g. a customer; in fact, for example, the body of strut 130 in these figures remain the same and, based on a request or a requirement, it is possible to easily mount part 137-2 or part 137-3 or part 137-4 to the body.

FIG. 5 shows a possible positioning of multiple nozzles at the struts 130 of compressor 1000 of FIG. 1. There are nozzles located on the tips of the trailing edge regions of the struts. There are also nozzles 137 located on an inner wall delimiting flow path 500 at bellmouth section 100. There are also nozzles 138 located on an outer wall delimiting flow path 500 at bellmouth section 100. These three positioning may be combined in any possible way independently from the specific combination shown in FIG. 5.

It is to be noted that, even if this is not shown in any figure, nozzles may be located on an inner and/or an outer wall delimiting flow path 500 at positions different from bellmouth. In this case, they may be located between a first stage (for example blades 240) of compressor 1000 and a last stage (for example blades 260) of compressor 1000, for example close to vanes (for example vanes 250).

Figure 6:
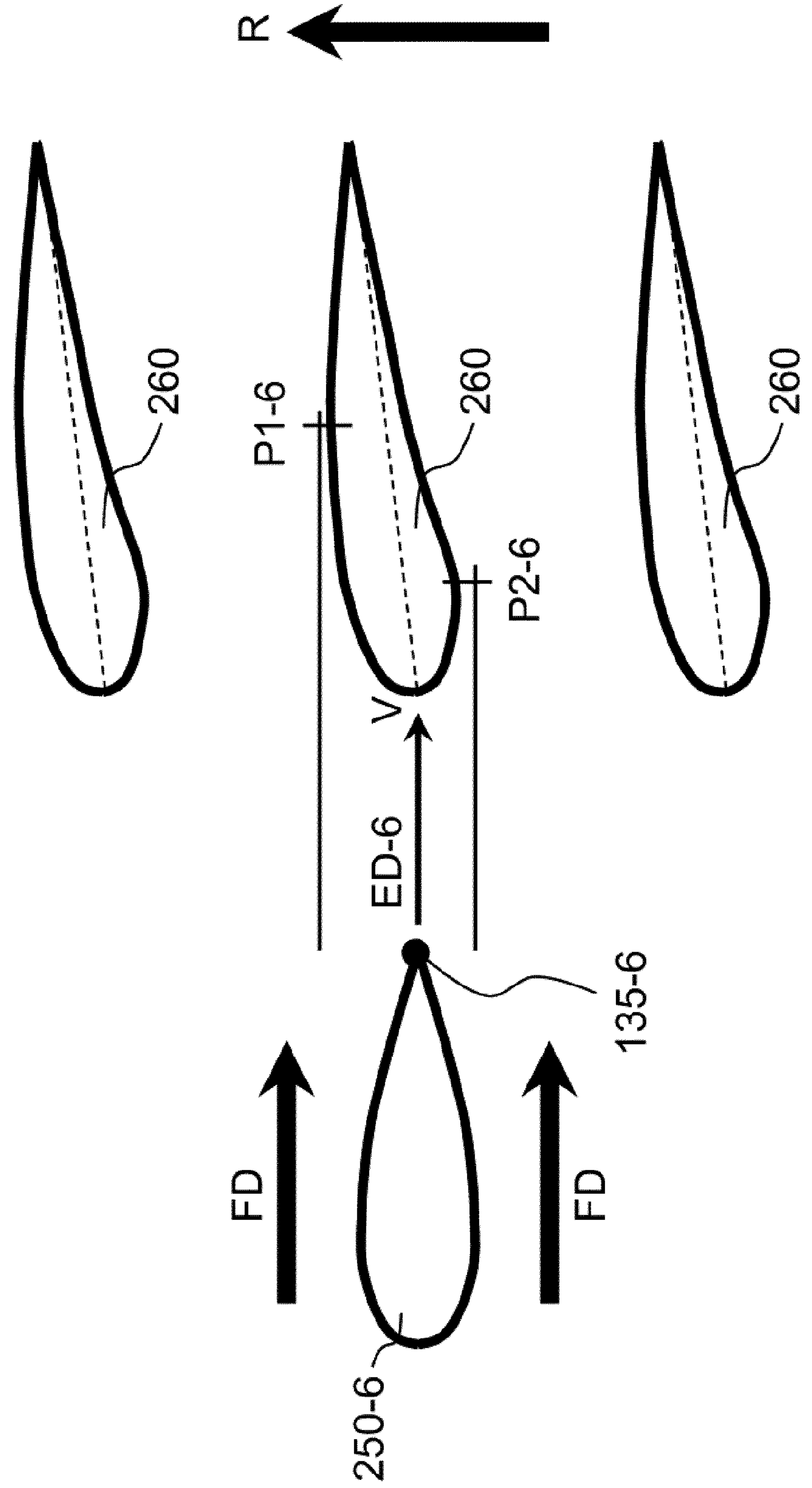
FIG. 6 illustrates a schematic cross-section view of a first embodiment of a (stationary) vane and of an embodiment of a set of (rotary) blades of the turbomachine of FIG. 1.
Figure 7:
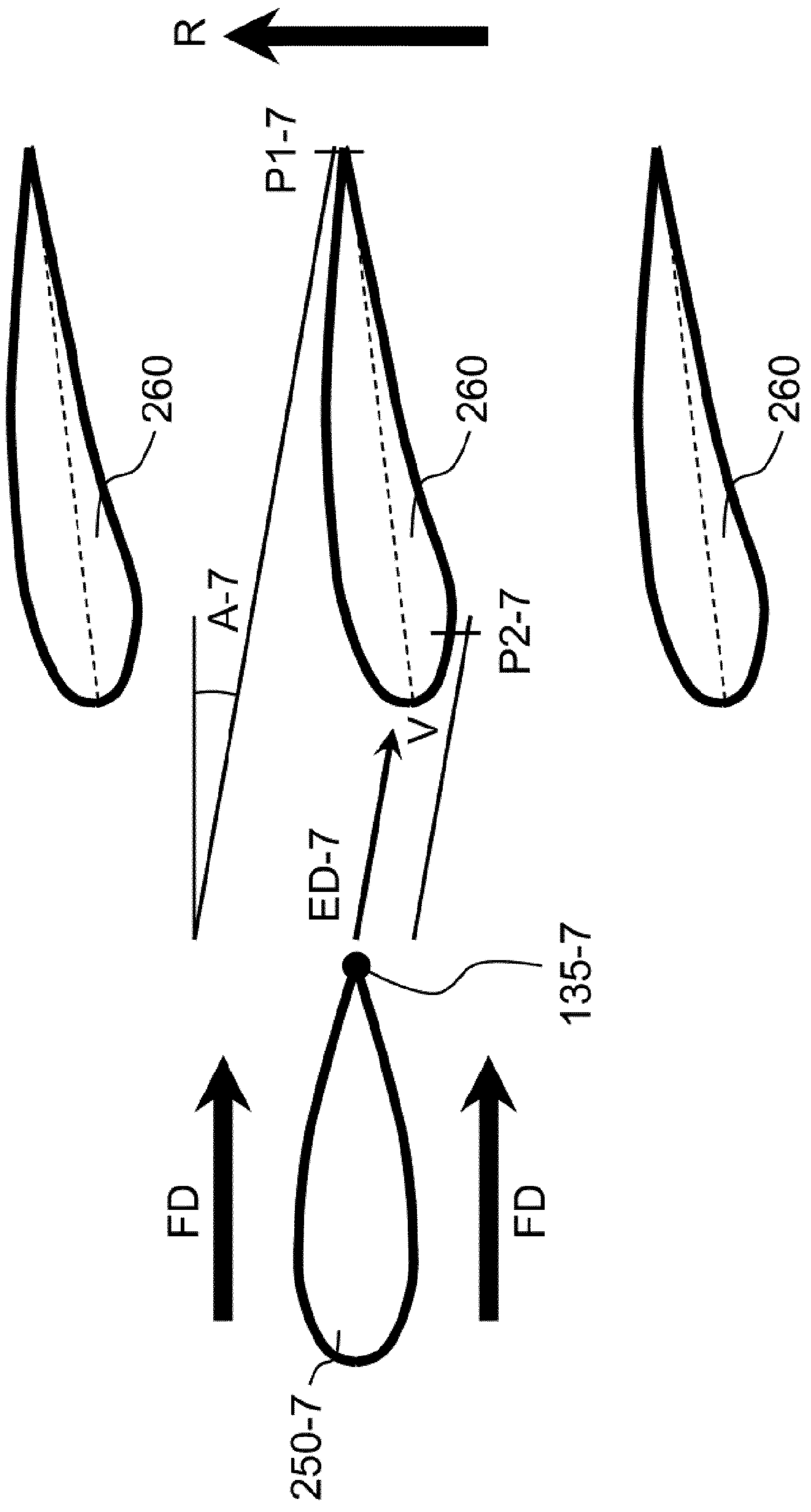
FIG. 7 illustrates a schematic cross-section view of a second embodiment of a (stationary) vane and of an embodiment of a set of (rotary) blades of the turbomachine of FIG. 1.
Figure 8:
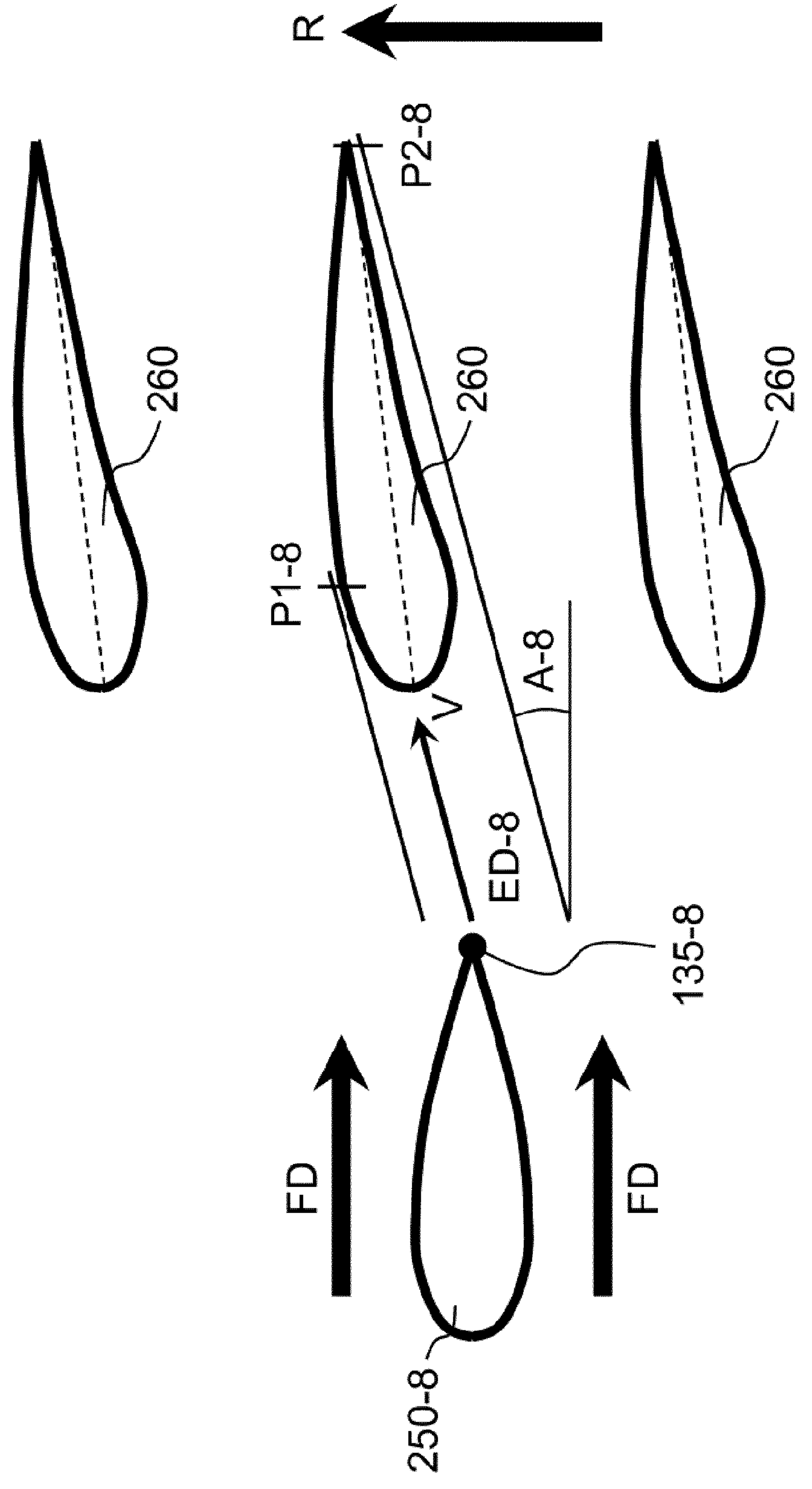
FIG. 8 illustrates a schematic cross-section view of a third embodiment of a (stationary) vane and of an embodiment of a set of (rotary) blades of the turbomachine of FIG. 1.

Referring to FIG. 6 and FIG. 7 and FIG. 8, three embodiments of a stationary vane 250, namely 250-6 and 250-7 and 250-8, are shown and their effect on rotary blades 260 of a compression stage of compressor 1000—arrow R shows the rotation direction of blades 260. In the embodiment of FIG. 6, a nozzle 135-6 is located on the tip of the trailing edge and ejects washing liquid in an ejection direction ED-6 corresponding to flow direction FD of flow path 500. In the embodiment of FIG. 7, a nozzle 135-7 is located on the tip of the trailing edge and ejects washing liquid in an ejection direction ED-7 inclined with respect to flow direction FD of flow path 500 by an angle A-7 of approximately e.g. −15°. In the embodiment of FIG. 8, a nozzle 135-8 is located on the tip of the trailing edge and ejects washing liquid in an ejection direction ED-8 inclined with respect to flow direction FD of flow path 500 by an angle A-8 of approximately e.g. +15°.

Nozzles 135-6, 135-7, 135-8 eject washing liquid so to reach blades 260; in particular, ejection form one nozzle reach only one blade at a time (or a limited number of vane at a time, for example two or three or four). According to these embodiments, nozzles 135-6, 135-7, 135-8 eject washing liquid so to reach both the pressure side and the suction side of blades 260; in FIG. 6, portion from V to P1-6 of suction side is reached by washing liquid and portion from V to P2-6 of pressure side is reached by washing liquid, in FIG. 7, portion from V to P1-7 (i.e. all) of suction side is reached by washing liquid and (small) portion from V to P2-7 of pressure side is reached by washing liquid; in FIG. 8, (small) portion from V to P1-8 of suction side is reached by washing liquid and portion from V to P2-8 (all) of pressure side is reached by washing liquid. In general, the quantity of washing liquid reaching the pressure side may be equal to or different from the quantity of washing liquid reaching the suction side.

As it is apparent from the above description, the cleaning methods disclosed herein provide that blades and/or vanes of a turbomachine are washed by ejecting a washing liquid from at least one stator aerodynamic component placed inside a flow path of a working fluid of the turbomachine; in particular, the washing liquid is ejected from one or more nozzles at least one stator aerodynamic component. The blades may be blades of a first stage of the turbomachine and/or blades of an intermediate stage of the turbomachine and/or blades of a last stage of the turbomachine. The vanes may be vanes of a first vanes array of the turbomachine and/or vanes of an intermediate vanes array of the turbomachine and/or vanes of a last vanes array of the turbomachine.

The stator aerodynamic components as disclosed herein may be used to eject a washing liquid being for example water, in particular demineralized water, and possibly a detergent. The composition of the washing liquid may depend on when (for example in operating mode or in non-operating mode) and/or where cleaning is carried out. However, the stator aerodynamic components as disclosed herein may be used to eject other liquids useful for specific applications in a turbomachine.

The cleaning method as disclosed herein may be carried out online and/or offline. In other words, the nozzles in the stator aerodynamic components may be activated when the turbomachine is operative, when the turbomachine is non-operative (but rotating) and both in operating mode and in non-operating mode.

The washing liquid may be ejected for example in continuous manner or in pulsating manner.

During cleaning as disclosed herein, at least one parameter may be set or controlled when the blades and/or the vanes are washed. Such parameter may be for example temperature of the washing liquid, pressure of the washing liquid, composition of the washing liquid, ejection velocity of the washing liquid, ejection direction of the washing liquid.

Figure 9:
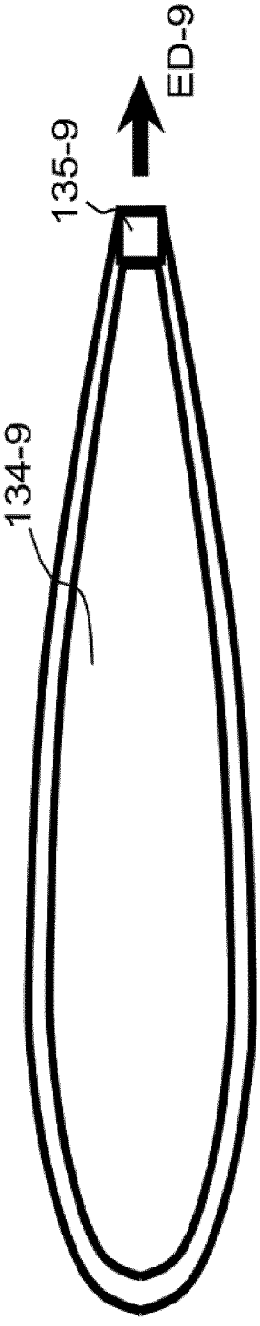
FIG. 9 illustrates a schematic cross-section view of a fourth embodiment of a strut of the turbomachine of FIG. 1.
Figure 10:
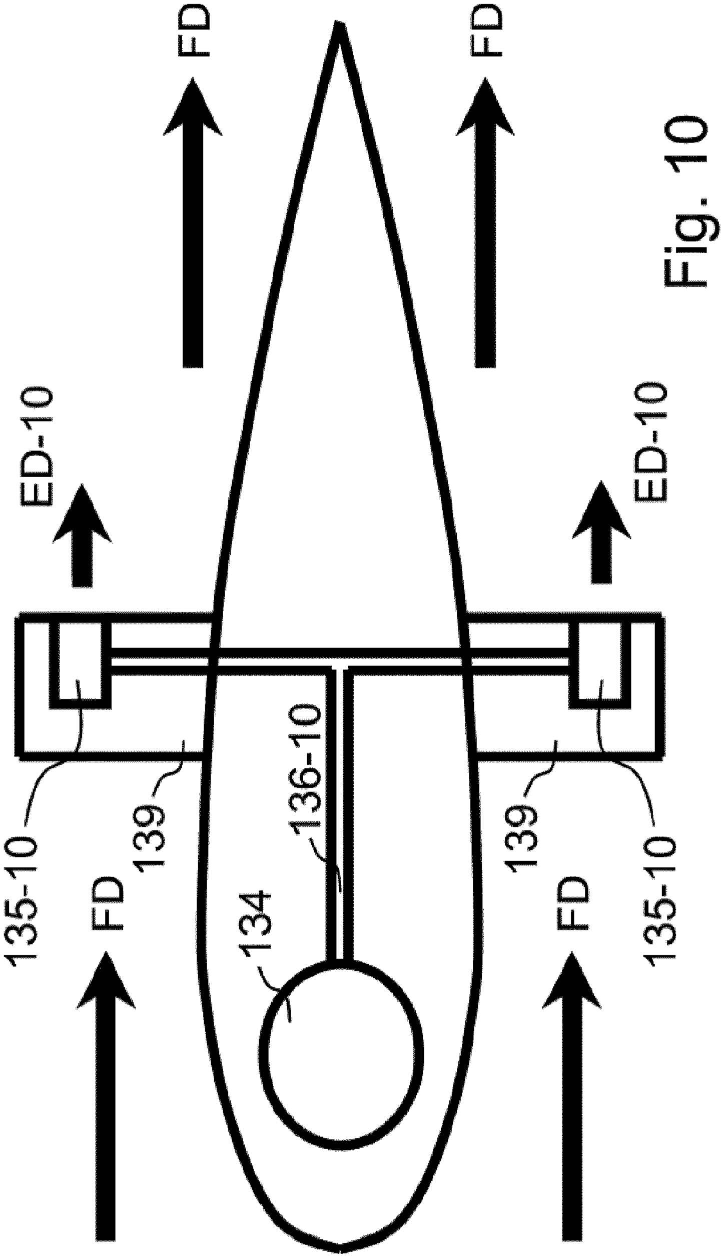
FIG. 10 illustrates a schematic cross-section view of a fifth embodiment of a strut of the turbomachine of FIG. 1.

FIG. 9 and FIG. 10 show embodiments of a stator aerodynamic component, in particular a strut, of the turbomachine of FIG. 1 wherein the fluid connection between nozzle and duct is according to extreme cases.

In FIG. 9, a duct 134-9 is directly fluidly connected to a nozzle 135-9 that ejects washing liquid in direction ED-9; in other words, the connection channel has length equal to zero (i.e. no connection channel); the duct has roughly the same cross-section area as the stator aerodynamic component.

In FIG. 10, a duct 134 is fluidly connected to at least two nozzles 135-10 that eject washing liquid in direction ED-10 through a long channel 136-10 that, in particular, is branched (a first branch goes to a first nozzle 135-10 and a second branch goes to a second nozzle 135-10); nozzles 135-10 are located respectively on poles 139 that may project from the airfoil surface of the stator aerodynamic component (a first branch is internal to a first pole and a second branch is internal to a second pole) and that may have an aerodynamic cross-section for example smaller than the cross-section of the component (as e.g. in FIG. 10). The poles 139 may be movable (for example, they can rotate and/or translate) so that they may be located internally to the stator aerodynamic component when not used for ejecting the liquid. Such movement may be advantageously caused by a pressure of the liquid to be ejected; for example, when the pressure increases a pole moves, by effect of the pressure, out of the component and the liquid is ejected and when the pressure decreases a pole moves back, by effect of the pressure, into the component and the liquid is no longer ejected.

Figure 11:
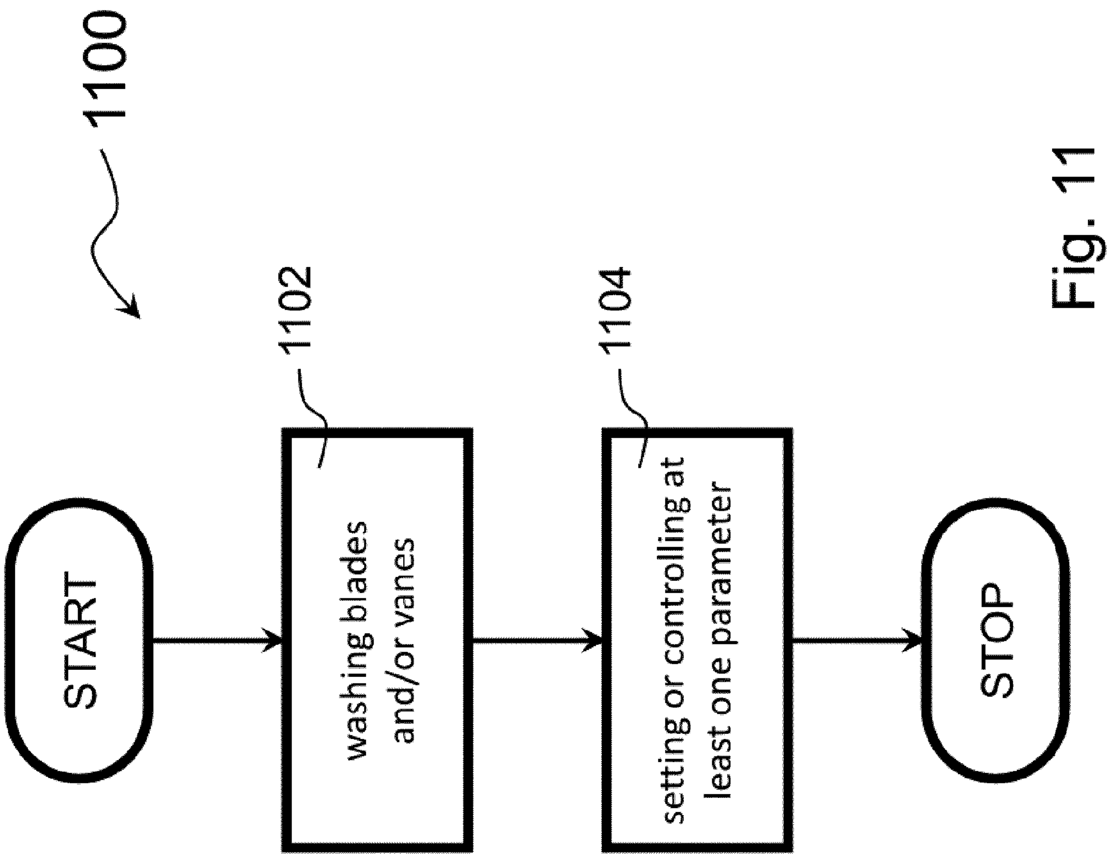
FIG. 11 shows a flow chart of an embodiment of a cleaning method.

FIG. 11 shows a flow chart 1100 of an embodiment of a cleaning method. This cleaning method comprises the steps of: —step 1102: washing blades and/or vanes of a turbomachine by ejecting a washing liquid from at least one stator aerodynamic component placed inside a flow path of a working fluid of the turbomachine, and step 1104: setting or controlling at least one parameter when the blades and/or the vanes are washed.

The at least one parameter is selected from the group comprising temperature of the washing liquid, pressure of the washing liquid, composition of the washing liquid, ejection velocity of the washing liquid, ejection direction of the washing liquid. It is to be noted that these two steps can be performed in any suitable order and/or repeated one or more times, although in FIG. 11 there is only one step 1102 and only one step 1104. and step 1102 precedes step 1104.

It is to be noted that according to the embodiments just described and shown, the stator aerodynamic component is a component that is already a part of an existing turbomachine. However, according to other embodiments, a turbomachine may comprise stator aerodynamic components specifically designed and mounted inside its flow path for washing purposes. In this case, the (longitudinal and/or transversal) size of one or more components may be small and/or the shape of one or more components may such as to provide low pressure drop and/or the position and/or orientation of one or more components may be such as to provide good washing.

The invention claimed is:

1. A stator aerodynamic component to be placed inside a flow path of a working fluid of a turbomachine, the component comprising:

a body having an airfoil shape with a first section forming a leading edge and a second section forming a trailing edge, the second section being removeable from the first section;

a duct in the first section of the airfoil shape, the duct arranged to carry a liquid; and a first nozzle fluidly connected to the duct and located in the second section of the airfoil shape, the first nozzle arranged to eject liquid into the flow path.

2. The stator aerodynamic component of claim 1, wherein the first nozzle is arranged to eject liquid in an ejection direction corresponding to a flow direction of the flow path.

3. The stator aerodynamic component of claim 1, wherein the first nozzle is arranged to eject liquid in an ejection direction that is at an angle to a flow direction of the flow path.

4. The stator aerodynamic component of claim 1, wherein the first nozzle is arranged to eject liquid in an ejection direction that is inclined relative to a flow direction of the flow path.

5. The stator aerodynamic component of claim 1, further comprising:

a second nozzle fluidly connected to the duct and located in the second section of the airfoil shape, wherein the first nozzle and the second nozzle are arranged to eject liquid into the flow path in different directions.

6. The stator aerodynamic component of claim 1, wherein the first nozzle is arranged to eject liquid so as to reach a blade the turbomachine.

7. The stator aerodynamic component of claim 1, wherein the first nozzle is arranged to eject liquid so as to reach a suction side of a blade of the turbomachine.

8. The stator aerodynamic component of claim 1, wherein the first nozzle is arranged to eject liquid at an angle of between +5° and +90° relative to a flow direction of the flow path.

9. The stator aerodynamic component of claim 1, wherein the first nozzle is arranged to eject liquid at an angle of between −5° and −90° relative to a flow direction of the flow path.

10. The stator aerodynamic component of claim 1, further comprising:
- a second nozzle fluidly connected to the duct and located in the second section of the airfoil shape,
- wherein the first nozzle and the second nozzle are arranged to eject liquid into the fluid pathway from a first side of the airfoil shape.

11. The stator aerodynamic component of claim 1, further comprising:
- a second nozzle fluidly connected to the duct and located in the second section of the airfoil shape,
- wherein the first nozzle and the second nozzle are arranged to eject liquid into the fluid pathway from an end of the airfoil shape.

12. The stator aerodynamic component of claim 1, wherein the first nozzle is arranged to eject liquid so as to reach a vane of the turbomachine.

13. The stator aerodynamic component of claim 1, wherein the first nozzle is arranged to eject liquid so as to reach a pressure side of a vane of the turbomachine.

14. The stator aerodynamic component of claim 1, wherein the first nozzle is arranged to eject liquid so as to reach a suction side and a pressure side of a blade of the turbomachine.

15. The stator aerodynamic component of claim 1, wherein the first nozzle is arranged to eject liquid so as to reach a suction side and a pressure side of a blade of the turbomachine, and wherein the quantity of liquid reaching the pressure side is equal to or different from the quantity of liquid reaching the suction side.

16. The stator aerodynamic component of claim 1, wherein the first nozzle is arranged to eject liquid so as to reach a suction side and a pressure side of a vane of the turbomachine.

17. The stator aerodynamic component of claim 1, wherein the first nozzle is arranged to eject liquid so as to reach a suction side and a pressure side of a vane of the turbomachine, wherein the quantity of liquid reaching the pressure side is equal to or different from the quantity of liquid reaching the suction side.

18. A turbomachine, comprising:
- a flow path for a working fluid;
- a stator aerodynamic component placed inside the flow path;
- the stator aerodynamic component comprising:
  - a body having an airfoil shape with a first section forming a leading edge and a second section forming a trailing edge, the second section being removeable from the first section;
  - a duct in the first section of the airfoil shape, the duct arranged to carry a liquid; and
  - a nozzle fluidly connected to the duct and located in the second section of the airfoil shape, the nozzle arranged to eject liquid into the flow path.

19. The turbomachine of claim 18, wherein the nozzle is arranged at a bellmouth of said turbomachine.

20. The turbomachine of claim 18, wherein the nozzle is arranged between a first stage and a last stage of said turbomachine.

* * * * *